United States Patent [19]

Popat et al.

[11] Patent Number: 5,662,976
[45] Date of Patent: Sep. 2, 1997

[54] LAMINATED CARD ASSEMBLY

[75] Inventors: Ghanshyam H. Popat, Alta Loma; Thomas Mammen, La Verne; David Robertson, Upland, all of Calif.; André M. Saint, Tonawanda, N.Y.

[73] Assignee: Avery Dennison Corporation, Pasadena, Calif.

[21] Appl. No.: 327,981

[22] Filed: Oct. 24, 1994

[51] Int. Cl.⁶ .................................................. B65D 65/28
[52] U.S. Cl. ........................ 428/40.1; 40/628; 40/629; 40/630; 283/81; 283/101; 283/106; 283/109; 428/41.7; 428/41.8; 428/41.9; 428/42.2; 428/42.3; 428/43; 428/137; 428/138; 428/212; 428/220; 428/356; 428/914
[58] Field of Search ................................ 428/40, 41, 43, 428/914, 212, 356, 220, 137, 138; 283/101, 81, 106, 109; 40/628, 629, 630, 626

[56] References Cited

U.S. PATENT DOCUMENTS

| | | | |
|---|---|---|---|
| 4,773,677 | 9/1988 | Plasse | 283/77 |
| 5,058,926 | 10/1991 | Drower | 283/109 |
| 5,096,229 | 3/1992 | Carlson | 283/75 |
| 5,131,686 | 7/1992 | Carlson | 283/75 |
| 5,171,039 | 12/1992 | Dusek | 283/75 |
| 5,172,938 | 12/1992 | Schmidt | 283/109 |
| 5,230,938 | 7/1993 | Hess | 428/41 |
| 5,284,689 | 2/1994 | Laurash | 428/41 |
| 5,318,326 | 6/1994 | Garrison | 283/101 |
| 5,389,414 | 2/1995 | Popat | 428/40 |
| 5,518,787 | 5/1996 | Konkol | 428/43 |

*Primary Examiner*—Nasser Ahmad
*Attorney, Agent, or Firm*—Oppenheimer Poms Smith

[57] ABSTRACT

An assembly for creating laminated cards for printing by a laser printer has a backing sheet. The backing sheet has a first side with a release coating, and a second side with a printable surface. The assembly also has a card which has been cut from the backing sheet. A lamination sheet adhesively adheres to the first side of the backing sheet and to the cut card. A lamination strip which has been cut from the lamination sheet has a first portion which adheres to and covers one surface of the card. The lamination strip also has an integral second portion which adheres to the backing sheet adjacent to the cut card. The lamination strip maintains the cut card in the same position relative to the backing sheet that the card had prior to being cut. The assembly has a substantially constant thickness and substantially flat upper and lower surfaces so that the assembly can pass through a complex paper path without jamming. A method for creating laminated cards from such an assembly has several steps. A user feeds the assembly into a printer. The printer prints onto the surface of the card. The user removes the card from off the assembly and peels the lamination strip from the assembly. The user then folds the lamination strip to cover the printing surface of the card.

28 Claims, 6 Drawing Sheets

LAMINATED CARD ASSEMBLY

FIELD OF THE INVENTION

This invention relates to the field of laminated cards and, in particular, to assemblies for making laminated identification cards, self-adhering index tabs, and hanging file folder tabs that can be fed into a laser printer, ink jet printer, photocopier or the like without jamming.

BACKGROUND OF THE INVENTION

Modern society has found innumerable uses for laminated cards. Perhaps billions of such cards have been made for use as conference name tags, personal identification cards, gift tags, parking passes, playing cards, and so on. Other types of laminated cards include adhesive index tabs and hinging file folder tabs. Indeed, nearly everyone has a laminated card of some sort.

In the not so distant past, simple laminated cards such as club membership cards were made by hand. A secretary would typically insert a card into a typewriter and would type in relevant information such as the member's name and date of admission. After the member had signed the card, the secretary would place the card on a sheet of transparent plastic for forming the lamination assembly. The secretary would then fold the lamination over the card, press the lamination down to seal the card within the lamination, and cut the lamination about the card to remove any excess.

In the 1980's, dot matrix printers came into wide-spread use. Laminated card assemblies were developed for dot matrix printers to simplify the process of making a laminated card. A typical dot matrix laminated card assembly had tractor feed holes running along either side of the assembly so that it could be fed through the dot matrix printer. A lamination sheet was attached to a card on one side and had a thin backing on the other side. The dot matrix printer would print information on the back of the card, after which the secretary would remove the card from the printer, remove the backing from the lamination, and fold the lamination over the card. The secretary would then cut off the tractor feed holes with scissors, or tear off the strip of holes if perforation lines were provided for that purpose.

In the 1990's, laser printers and ink jet printers replaced dot matrix printers as the printers of choice. Such printers are capable of printing high resolution text and graphics at a high speed with very little noise. Unfortunately, the old tractor feed laminated card assemblies did not work well in laser printers and ink jet printers and photocopiers for at least two reasons. First, the tractor feed holes of the dot matrix assemblies caused the assemblies to jam in the laser printer or ink jet printer paper feed path. Second, the dot matrix laminated card assemblies tended to have non-uniform thickness across the width of the assembly. For instance, the half of the assembly having the lamination and backing might be 6.5 mils thick, while the adjoining half having the lamination and card might be 9 or more mils thick. This variation in thickness was a second reason why the assemblies would jam in laser printers.

Thus, there has been a very substantial need to develop an assembly for conveniently printing laminated cards in a laser printer, ink jet printer, photocopier or other printer requiring a substantially flat printing surface.

There has also been a substantial need to develop a general type of assembly which can be alternatively employed to create laminated identification cards, self-laminating hanging file folder tabs, and self-laminating adhesive index tabs. Each of these applications is related to the others in that they all involve a card which is laminated by a lamination member which folds over and seals the card. Conceptually, then, it would be of advantage to manufacturers of assemblies for printing in printers such as laser printers to be able to rely on a single type of assembly which can be utilized for a wide variety of applications relating to laminated cards.

SUMMARY OF THE INVENTION

It is therefore an object of the present invention to provide an assembly for making laminated cards using a laser printer, ink jet printer or photocopier. It is also an object to provide an assembly having substantially constant thickness and flat upper and lower surfaces so that the assembly will not jam in the complex paper path of laser or ink jet printers, or photographic copiers. It is a further object of the invention to provide an assembly which can yield laminated identification cards, laminated self-adhesive index tabs or laminated hanging file folder tabs with only a slight variation in die-cuts and/or perforations.

Viewed from a broad perspective, the invention may be an assembly for creating laminated cards, such as identification cards, hanging file tabs, and index tabs, for printing by a laser printer, ink jet printer or photocopier. The assembly may have a backing sheet which has two sides. One side of the backing sheet has a surface for receiving printing. The backing sheet may also be die cut to provide at least one opening with a card or cards which completely fill the openings and which are removably positioned in the openings. A lamination sheet is adhesively adhered to the backing sheet on the side opposite the side having the printing surface. The lamination sheet may also be die cut to provide a removable lamination member which adheres to and covers one surface of the card and which also removably adheres to the backing sheet in the area adjacent to the opening. The assembly has a substantially constant thickness and substantially flat upper and lower surfaces when the card is positioned in and fills the opening. The constant thickness and flat upper and lower surfaces allow the assembly to pass through a complex paper path of a laser or ink jet printer or photocopier without jamming.

In accordance with the various features which may be associated with this broad perspective of the invention, the assembly may have more than one card and corresponding lamination member. The assembly may have lines of perforation which separate the assembly into sections. Each of the sections may have at least one lamination member and at least one card. An embodiment of the assembly may be approximately 8½ inches wide by 11 inches long, and may be divided symmetrically in its lengthwise or widthwise direction into two sections or more by a line of microperforations which extend across the width or length of the assembly. The line of microperforations may extend through both the sheet of lamination and the backing sheet. The backing sheet may have certain areas which have a release coating for convenience in peeling back a portion of the transparent plastic laminating sheet. Alternatively, the backing sheet may be coated across its entire width and length with a release coating. Additionally, the assembly is preferably no more than fifteen mils thick, so as to prevent jamming in a complex printer sheet feed path. Permanent pressure sensitive adhesive may be employed to secure the cards to and within the lamination. Further, the laminating plastic preferably has an area slightly more than twice that of the card, so that it may cover both sides of the card and seal around the edges thereof.

Working from the broad invention to particular embodiments, one version of the present invention may have a backing sheet which has a first face with a printing surface and a second face opposite the first face. A sheet of transparent plastic lamination material may be juxtaposed to the second face and may adhere to the second face with a coating of pressure sensitive adhesive in at least some areas of the sheet of lamination. There may be more than one card die cut from the backing sheet. These cards remain in place on the backing sheet at the positions from which they were cut. The sheet of lamination may be cut into more than one lamination member. Each of these lamination members may cover and adhere to a corresponding card to form a card/lamination set. Each of the lamination members also removably adheres to the backing sheet. The backing sheet and the sheet of transparent lamination material may be substantially coextensive, such that each has substantially the same width and length as the other. The assembly may be substantially flat and may have substantially constant thickness so as to prevent jamming in a laser printer, ink jet printer, photocopier or other printer requiring a substantially flat printing surface. Each of the card/lamination sets may be individually detached from the assembly, and each lamination member may be folded over after detachment from the assembly to laminate its corresponding card.

In accordance with various features which may be included in embodiments of the present invention, the assembly may be divided into individual sections by lines of microperforations which extend through both the backing sheet and the lamination sheet. Each individual section has at least one of the card/lamination sets. Each section may be individually separated along a line of microperforations from the assembly for individual printing in a laser printer, ink jet printer or photocopier. The lamination member may be symmetrical and have a line of perforations along its line of symmetry. The user is thereby assisted in folding the lamination member about the line of symmetry. The assembly is preferably no greater than 15 mils thick. The pressure sensitive heat adhesive may optionally be a permanent adhesive. The backing sheet may be any of a variety of materials, including paper and cardstock. The assembly may be divided into two or more identical sections in its lengthwise or widthwise directions by one or more lines of microperforations. These microperforations may extend through both the sheet of lamination and through the backing sheet.

A specific embodiment of the present invention may be an assembly for creating laminated cards for printing by a laser printer, ink jet printer or photocopier. The assembly may have a sheet of cardstock which has a first face and a second face. The first face has a printing surface for receiving indicia from a printer. The second face, which is on the opposite side of the sheet from the first face, has areas which have a release coating. The assembly also has a sheet of plastic film which is juxtaposed to and adheres to the second face of the sheet of cardstock. The plastic film may have a coating of pressure sensitive adhesive which adheres the plastic sheet to the second face of the cardstock sheet. There may be more than one card die cut from predetermined positions of the sheet of cardstock. The cards remain in the same predetermined position on the sheet of cardstock from which they were cut. The sheet of plastic film may be cut into more than one symmetrical lamination members, which each have a line of symmetry. Each of the lamination members may cover and adhere to a corresponding one of the cards to form a card/lamination set. Each of the lamination members also removably adheres to the sheet of cardstock in at least one of the areas that has a release coating. The lamination members may be longer and wider than their corresponding cards, so that they may be folded over and seal the card on both sides and around the edges of the card. The assembly may be divided into individual sections by lines of microperforations. Each of the individual sections may comprise at least one of the card/lamination sets, such that the sections may be individually separated along the lines of microperforations from the assembly for individual printing in a laser printer, ink jet printer or photocopier. The sheet of cardstock and the sheet of plastic film may be substantially coextensive, so that each has substantially the same width and length as the other. The assembly may be substantially flat and may have substantially constant thickness so as to prevent jamming in a laser printer, ink jet printer or photocopier. Each of the card lamination sets may be individually detached from the assembly, and each member may be folded over at its line of symmetry after detachment from the assembly to laminate its corresponding card.

In accordance with various other features which may be included in embodiments of the present invention, the cards may be substantially rectangular and the lamination members may be substantially rectangular lamination strips which are approximately twice as long as the cards. The lamination member may comprise a line of perforations along the lines of symmetry which assist the user in folding the lamination member about the line of symmetry to laminate the card. The card lamination set may alternatively be for making a hanging file tab. The finished hanging file tab has a left engagement toe and a right engagement toe when the lamination member is folded about its line of symmetry over its corresponding card. The engagement toes each include an inwardly extending slot so that the right and left toes may engage in slots of a hanging file folder. The card/lamination sets may alternatively be cut for making index tabs. The card adheres to the lamination member entirely on one side of the line of symmetry of the lamination member. The card may have one edge along the line of symmetry, and the length of the card may be less than the length of one symmetrical half of the lamination member. The assembly is preferably no greater than 15 mils thick. The pressure sensitive adhesive may be a permanent adhesive. The assembly may be divided into at least two identical sections in its lengthwise direction by one or more lines of microperforations which extend through both the sheet of plastic lamination and the sheet of cardstock.

The present invention also encompasses a method for creating laminated cards from a certain type of assembly. The assembly has a backing sheet, a card which has been die cut from the backing sheet and which has a printing surface, a lamination sheet adhesively adhered to the backing sheet and to the die cut card, and a lamination member. The lamination member has been die cut from the lamination sheet, and it adheres to the card and to the backing sheet adjacent to the die cut card. The backing sheet may have a release coating in at least some of the areas where the lamination adheres to the backing sheet. The assembly may have substantially constant thickness and substantially flat upper and lower surfaces. The method may have a number of steps. One step is feeding the assembly into a printer. Another step is printing onto the printing surface of the card. An additional step is removing the card and the lamination member together from the assembly, with the card being adhered on the side opposite to its printing surface to the lamination member. A further step may be folding the lamination member over to cover the printing surface of the card and a final step may include pressing the lamination member and the entire card firmly to seal the lamination over the card. In accordance with various other steps that may be included in the method, the lamination member may include a line of perforations dividing the lamination member into two symmetrical halves, and the step of folding the lamination member over may include folding the lamination member over at the line of perforations. The printing surface of the card is thereby covered by the lamination member, and the line of perforations assist the user in folding the lamination member in the proper orientation. A laser printer may perform the step of printing onto the printing surface of the card. The card may have edges, with the lamination member extending beyond the edges of the card. The step of pressing the lamination member and the entire card to seal the lamination member over the card may then include pressing the lamination member about the edges of the card to seal the lamination about the edges of the card.

Other objects, features and advantages will become apparent from a consideration of the following detailed description and from the accompanying drawings.

DETAILED DESCRIPTION OF PREFERRED EMBODIMENTS

Figure 1:
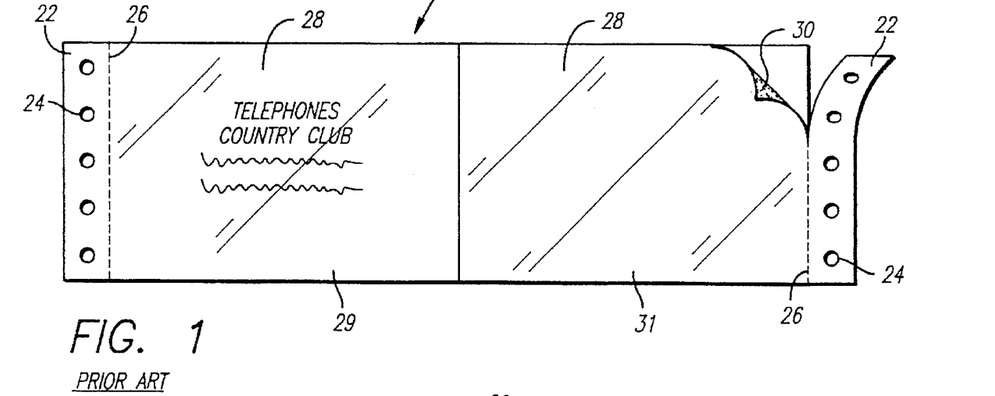
FIG. 1 is a front view of a prior art laminated card assembly for feeding into a printer having a tractor feed apparatus.

Referring more particularly to the drawings, FIG. 1 shows a prior art assembly 20 for printing cards in a dot matrix or other type of printer equipped with a tractor feed mechanism. Prior art assembly 20 includes tractor feed strips 22 having tractor feed apertures 24. Tractor feed strips 22 are removable from assembly 20 at lines of perforation 26. The front of the assembly 20 has a layer of lamination 28 which is coated with a pressure sensitive adhesive 30.

Figure 2:
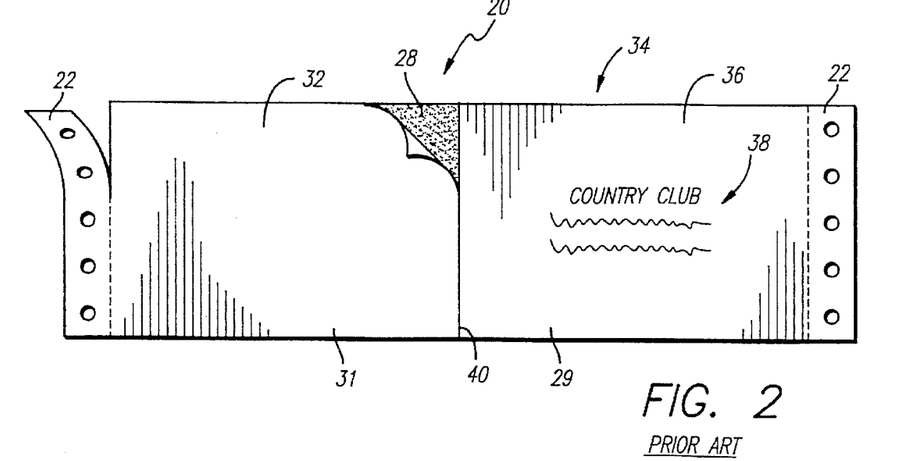
FIG. 2 is a rear view of the prior art assembly of FIG. 1, showing a backing layer partially removed from the front lamination.

FIG. 2 illustrates the back side of the prior art assembly 20 of FIG. 1. FIG. 2 shows a piece of lining material 32 being removed from adhesively backed lamination layer 28. The right hand side of the assembly of FIG. 2 is a card 34 having a printable surface 36. Generally speaking, the assembly is fed through a tractor feed printer, which prints indicia 38 onto printing surface 36. This indicia 38 may include personalized information such as a country club member's name, membership number, and so on. After the assembly has passed through the printer, the user may then sign the card 34, remove liner 32 from lamination layer 28, remove tractor feed strips 22, and fold lamination 28 over at line 40 to cover and adhere to card 34. The user then has a laminated membership card that she or he may carry with them.

As discussed previously, there are a number of problems with using the prior art assembly of FIGS. 1 and 2 in a modern day laser printer, ink jet printer, or photocopier. The left hand side 29 of assembly 20 has a thickness that is less than that of right hand side 31. Consequently, there is a sudden thickness change at line 40. This inconsistent thickness will tend to cause jamming in a laser printer, ink jet printer, or photocopier. The friction feed of these types of printers has difficulty grasping hold of such a varying thickness assembly. Additionally, tractor feed apertures 24 will both interfere with the friction feed of these printers as well as provide an opportunity for assembly 20 to become snagged in the interior of the printer. Consequently, the prior art assembly of FIGS. 1 and 2 is inappropriate for use in the types of printers that are most common in offices today.

Figures 3, 5, 7:
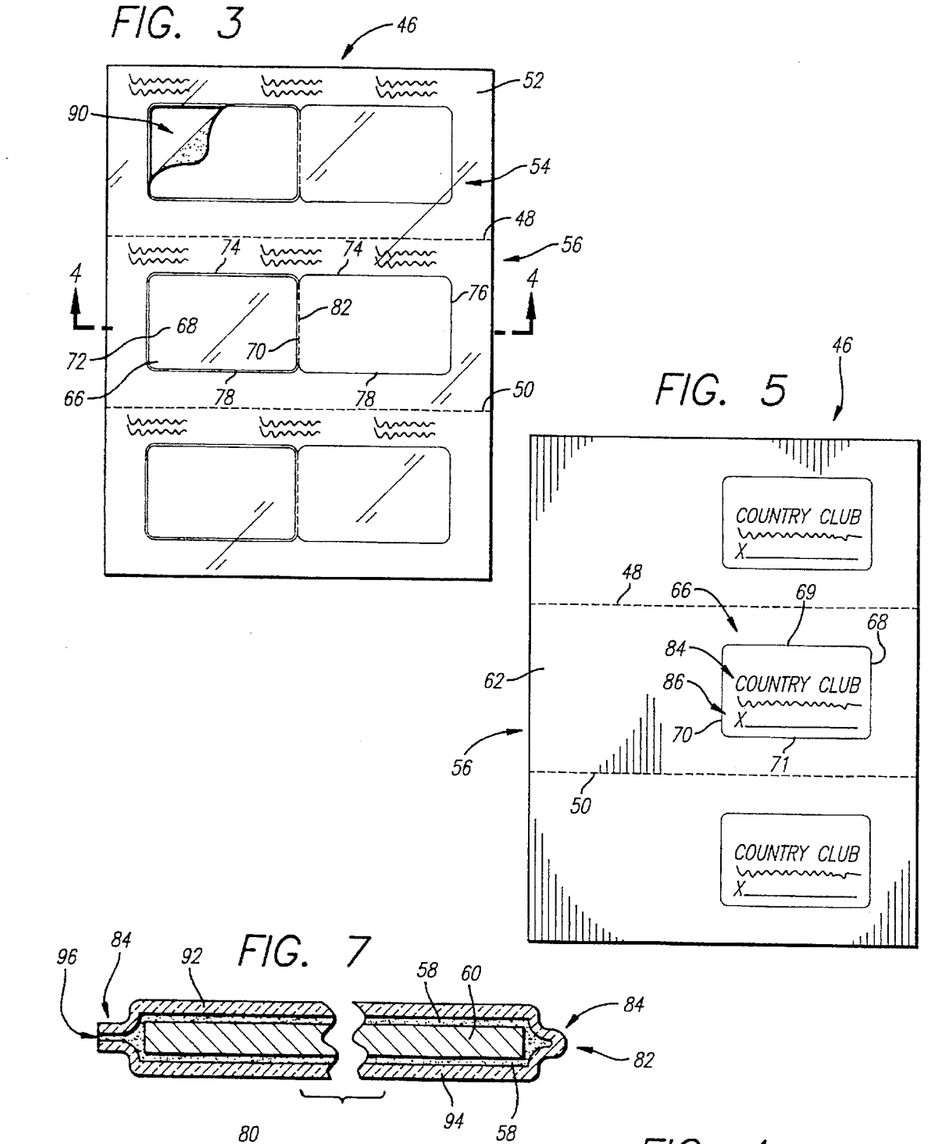
FIG. 3 is a front view of an embodiment of the present invention, showing a plurality of card/lamination strip sets.
FIG. 5 is a rear view of the assembly of FIG. 3, showing the printing surface of the assembly.
FIG. 7 is a cross-sectional view of a finished membership card, taken along line 7—7 of FIG. 6.

FIG. 3 illustrates a laminated card assembly 46 which is a preferred embodiment of the present invention. FIG. 3 shows that assembly 46 has three separate sections which are separable from one another along transverse lines of microperforations 48 and 50. Assembly 46 includes a top layer consisting of a lamination sheet 52, which is free of apertures or indentations which could interfere with feeding assembly 46 into a laser printer, ink jet printer, or photocopier. Each separable section of the assembly includes an identification card/lamination strip set such as 54.

Figure 4:
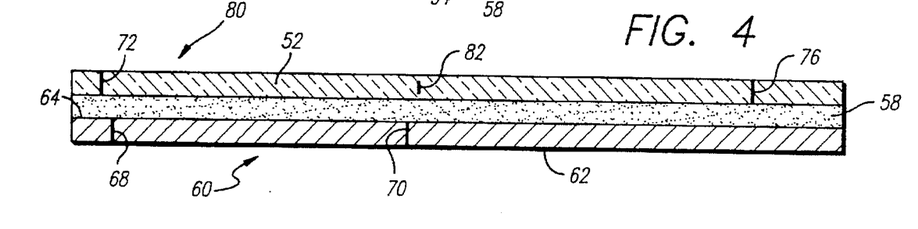
FIG. 4 is cross-sectional view taken about line 4—4 of FIG. 3.

FIG. 4 is a cross-sectional view taken along line 4—4 which crosses the width of assembly section 56. FIG. 4 shows that assembly 46 includes lamination layer 52, which is coated with a pressure sensitive adhesive layer 58. Assembly 46 also consists of a backing sheet 60 having a surface for printing 62 and a surface on the opposite side of the backing sheet 64 which has a release coating.

Figure 6:
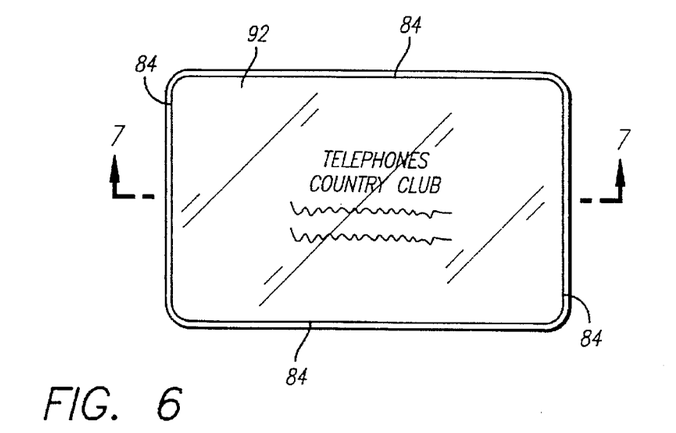
FIG. 6 is a front view of a finished membership card constructed from the assembly of FIGS. 3 and 5.

Backing layer 60 which is typically a heavy paper or light cardboard, is die cut into a rectangular card 66 (see FIG. 3) at lines 68 and 70. Lamination layer 46 is die cut at 72, 74, 76, and 78 (see FIG. 3) into a lamination strip 80, which normally remains in the same position on lamination 46 from which it was cut. The lamination strip 80 is perforated along a center line 82 so that the lamination strip may be easily folded over at perforation line 82. As can be seen in FIG. 4, the portion of lamination strip 80 defined by die cut 72 and line of perforation 82 is somewhat wider than the corresponding card portion defined by die cuts 68 and 70. The portion of lamination strip 80 defined by die cut lines 78 and 74 are also somewhat wider than the corresponding width of the card portion. Consequently, the finished card of FIG. 6 will have lamination edges 84 which extend around the card.

It should be noted that die cuts 72, 74, 76 and 78 extend completely through lamination layer 52, but do not penetrate into backing layer 60. Likewise, die cut lines 68, 69, 70 and 71 pass through backing layer 60, but do not extend into lamination layer 52. Line of perforation 82 passes through lamination layer 52, but does not extend into the backing sheet layer 60.

FIG. 5 illustrates the rear of assembly 46 corresponding to the front view in FIG. 3. A die cut card 66 is shown defined by die cut lines 68, 69, 70 and 71. As discussed in conjunction with FIG. 4, the back side of assembly 46 has a printable surface 62 which will receive printing from a laser printer, ink jet printer, or photocopier. Card 66 includes indicia 84 which the printer prints as the assembly passes through the printer. Such indicia may include the name of a particular club member, his or her membership number, and various other information that the user desires. Also provided is a signature blank 86 for the member to sign once the card is printed. The back of card 66 may also include various pre-printed indicia, which is common to all of a particular type of card. Die cut card 66 is held in place by lamination strip 80. The lamination strip 80 has a first portion which adheres to and covers the upper surface of the card and an integral second portion which adheres to the backing sheet adjacent to the cut card. The lamination strip thereby maintains the cut card in the same position relative to the backing sheet that it had been in prior to being cut. It should be noted that the assembly 46 has substantially constant thickness and substantially flat upper and lower surfaces so that the assembly can pass through a complex paper path of a laser printer, ink jet printer, or photocopier without jamming. It should also be noted that both the lamination sheet and the backing sheet are substantially aperture- and indentation-free so as to reduce the possibility of jamming.

Method Of Creating Laminated Cards From Assembly 46

The user has the option of printing an entire sheet of identification cards, or to separate the sheet into one or more sections for printing a reduced number of cards. When printing an entire sheet of cards, the user first feeds the entire assembly into the entry paper path of a printer. The printer then carries the assembly along its paper path and prints indicia onto the printing surface of the card or cards. Once the assembly exits the printer, the user removes the card from the assembly in a manner illustrated in FIG. 3 at 90. As discussed previously, the card is adhered on the side opposite to the printing surface to the lamination strip. After the card has been removed the assembly, the remainder of the lamination strip is peeled off of the assembly. The user may then fold the lamination strip over to cover the printing surface of the card. If the lamination strip includes a line of perforation such as 82, the user may fold the lamination strip over at the line of perforations to cover the printing surface of the card. The user may then press the entire card to seal the lamination strip over the card. The lamination strip may have dimensions greater than those of the card and, in that case, the user may press the entire card to seal the lamination about the edges of the card. It should be noted that after the card has been printed, but before the card has been sealed, the user may also sign his or her name on the card in ink. Alternatively, the user may also attach a photograph or other object onto the printing surface of the card prior to sealing the card. FIG. 7 is a cross-sectional view of a finished card after the user has sealed it. The finished card includes the first portion of the lamination strip 92, which covers the top of the card, and second portion of the laminated strip 94, which covers the bottom of the card. The edges of the lamination 84 which encompass and surround the card 60 are of two varieties. The right hand side of FIG. 7 shows an edge along perforated fold line 82. This edge has a continuous piece of lamination which is simply folded over itself. The other three edges of the laminated card, however, consist of first and second portions of the lamination strip 92, 94 coming together at a junction, such as 96. Pressure sensitive adhesive 58 bonds the lamination to card 60, and bonds the first and second portions 92, 94 of lamination layer 52 together about the edges of the card.

Materials From Which The preferred Embodiment Is Constructed

There are three basic material components to the present invention: the lamination layer 52, the adhesive layer 58, and the backing or card layer 60. The backing sheet preferably has a silicone release coating on one size thereof that facilitates peeling the lamination layer off of the backing sheet, as discussed above. Alternatively, fluorinated or amine-based release coatings may be used, or any other desirable coating. The release coating is preferably formed of a conventional silicone material which has a negligible thickness in the order of a few ten-thousandths of an inch. The backing layer itself preferably consists of paper having a thickness of approximately 6.0 mil. It is noted that the sheets are shown in the drawings thicker than their actual dimensions, the relative thicknesses are not to scale, and the sheets would usually be formed of fairly heavy paper or light cardboard stock, also known as card stock. The microperforations consist of cuts which vary in size from 0.0095 to 0.0105 inches and which are separated by ties that vary in size from 0.0045 to 0.0055 inches. Thus, there are between 63 and 69 perforations per inch, with about 66 perforations being an average between the two allowed extremes. More generally, the term "microperforations" indicates that there are more than about 35–40 perforations per inch.

The lamination layer is releasably attached to the backing layer by a stable, pressure-sensitive adhesive of a type which will not flow at a temperature of a few hundred degrees Fahrenheit. However, it is preferred that the pressure sensitive adhesive will remain stable when subjected to temperatures in the range of up to about 300 to about 400 degrees Fahrenheit to facilitate printing on the cards through laser or other high temperature printing equipment, as discussed above.

The adhesive should be a pressure-sensitive adhesive which does not easily degrade when exposed to ultra-violet light. That is, exposure to ultra violet light during normal use of the card should not turn the adhesive yellow or cause the adhesive to lose its tackiness. One such adhesive is described in U.S. Pat. No. 5,262,216. A suitable adhesive is the P60 hot melt adhesive which is available from the Avery Dennison Corporation. Generally speaking, the adhesive should be applied to the lamination layer in a coat of between 0.25 and 2.0 mils thick.

The lamination layer may be made from any of a number of materials, such as mylar. The lamination may have a coating that is receptive to toners and inks so that the finished card may have printing on the surface of the card as well as on the surface of the lamination. Printing on the surface of the lamination would most commonly be by an offset printing process, although it would be possible to print onto the lamination with a laser printer, ink jet printer or photocopiers.

Suitable coated and uncoated mylar lamination films are available from DuPont and the Dunmore Corporation. The lamination film should be between 1 and 4 mils thick.

The backing layer may be made from 100lb velum card stock, which is available from a wide variety of paper manufacturers and vendors, such as the Simpson Corporation. The backing should have a thickness of between 4 and 10 mils. The backing may have a light release coating, such as silicone, to prevent firm adherence of the lamination to the backing layer. The release coating should be extremely thin, in the range of between approximately 0.1 and 0.5 mils.

It should be noted that in selecting the above-mentioned materials, the overall thickness of the assembly should not exceed 15 mils. It has been observed that present day laser printers tend not to work well with assemblies having thicknesses grater than 15 mils. However, if future models of laser printers are developed to be capable of accepting assemblies having a thickness grater than 15 mils, then the maximum overall assembly thickness may be increased.

Additionally, the lamination and backing layer materials may be substantially flat so that the overall assembly has substantially constant thickness throughout its entire width and length, thereby reducing the likelihood that the assembly will jam in the complex paper path of a modern printer. The backing and lamination layers may also be free from apertures, tractor-feed holes, depressions and the like other than die cuts, perforations and other very minor discontinuities.

For purposes of clarity, it should be understood that the term "laser printer" refers not only to laser printers as such, but also to ink jet printers, photocopiers, and any other printer which will jam when a sheet having a non-constant thickness is input into the printer. The present invention is further intended to be used in conjunction with future types of printers not yet developed or not presently in widespread use. It should also be understood that the word "cut" refers not only to die cutting, but also to any other type of cutting, as well as to perforations. It should also be understood that the term "microperforations" is intended to encompass all constructions in which the edges of the backing sheet are smooth and substantially free of coarse irregularities following separation.

Exemplary dimensions of one embodiment are as follows. These dimensions are for purposes of illustration only and not of limitation. A full assembly may be 8½ inches wide by 11 inches long, with a thickness of between approximately 5.35 mils to 15 mils. An individual card may be between 3¼ inches long by 2 inches wide. A lamination strip may be 6¾ inches long and 2⅛ inches wide. The distance from the top of the assembly to the top of the uppermost lamination strip may be 1⅝ inches. The distance from the bottom of the assembly to the bottom of the lower most lamination strip may be ¼ inch. The distance from the left hand edge of the assembly to the left hand edges of the lamination strips may be 7/16 inch. The distance from the right hand edge of the assembly to the right hand edges of the lamination strips may be 1⅜ inches. The lamination strips may be vertically spaced from one another so that the bottom of an upper strip is 1½ inches away from the top of a lower strip.

A wide range of other dimensions are possible. For instance, the overall assembly dimensions may be 3 to 4¼ inches wide by 11 inches long. Alternatively, an 8½ inches wide by 11 inches long assembly may be divided into equal separable sections of 3⅔ inches long each. As discussed previously, each section has one or more card/lamination strip sets. Two lines of microperforations run across the entire width of the assembly to separate the sections. Alternatively, such lines of microperforations could run vertically along the length of the assembly to make vertical separable sections.

Various other dimensions and card shapes are also imaginable. For instance, as new printers are developed that can accommodate very narrow sheets, the present assemblies may be made correspondingly more narrow. Similarly, future printers may accommodate sheets that are more than 8½ inches wide, and the present assemblies may be made wider than 8½ inches within the scope of the invention.

First Alternative Preferred Embodiment: Adhesive Index Tabs

An alternative preferred embodiment of the present invention relates to an assembly for printing self-laminating adhesive index tabs in a laser printer, an ink jet printer or photocopier. A laminated adhesive index tab is a laminated tab that is used to identify sections within a document.

The assembly 100 consists of a sheet of principal material 102, such as cardstock or paper. Sheet 102 is die-cut into pieces 104, which are themselves divided by a line of microperforations 138. Each die-cut portion 104 has a printing card 106 and a cardstock wing 108. The line of perforations 138 separate printing area 106 from cardstock wing 108 cards 106 have a printing surface onto which indicia 110 may be printed. By a laser printer, an ink jet printer or a photocopier. All of these features are illustrated in FIG. 8, which shows the first outer surface of the assembly 100.

Figure 8:
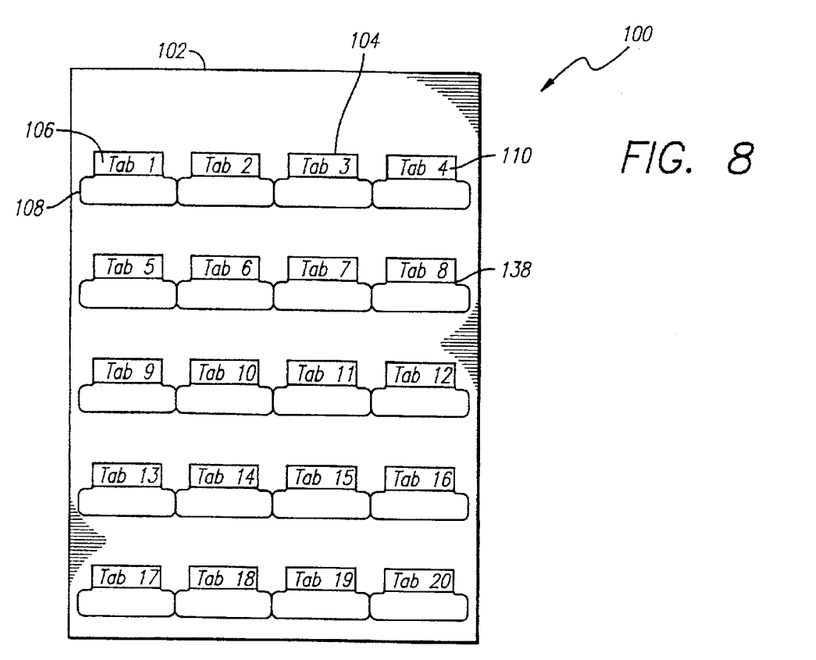
FIG. 8 is a perspective view of the printing surface of an alternative embodiment of the present invention.
Figure 9:
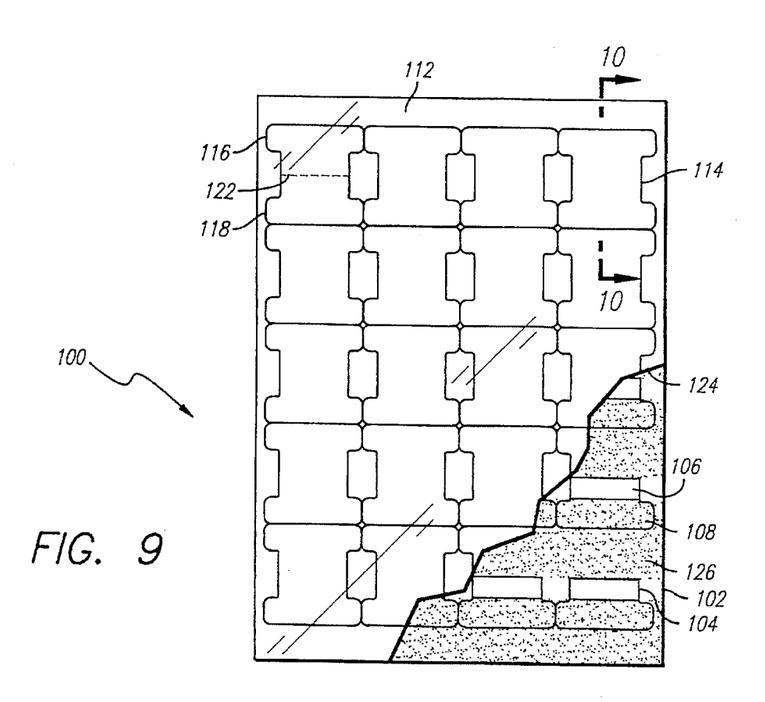
FIG. 9 is a perspective view of the lamination layer of the assembly of FIG. 8, which is on the opposite side of the assembly from the printing surface of FIG. 8, along with a cutaway view showing the backing layer and the adhesive release agent thereon.

FIG. 9 illustrates the second surface of assembly 100, which is on the opposite side of assembly 100 from the first side which FIG. 8 illustrates. The second side consists of a sheet of transparent plastic film 112 which has been die-cut into a repeated pattern 114. The repeated pattern 114 has a first wing 116, a second wing 118 and a central portion 120. A line of symmetry 122 bisects each die-cut pattern 114 into halves which are mirror images of each other. First wing 116 and second wing 118 are at opposite sides of the line of symmetry 122 from each other.

The partial cutaway view in the lower right hand corner of FIG. 9 shows that sheet of transparent plastic film 112 is juxtaposed to sheet of principal material 102. Sheet of transparent plastic film 112 and sheet of principal material 102 are substantially coextensive with each other, with sheet 112 having the same width and length as sheet 102. This coextensivity of sheets 112 and 102 ensure that the assembly has substantially constant thickness and substantially flat upper and lower surfaces. The assembly is thereby well suited for feeding into the complex paper path of a printer such as a laser printer without becoming jammed.

Figure 10:
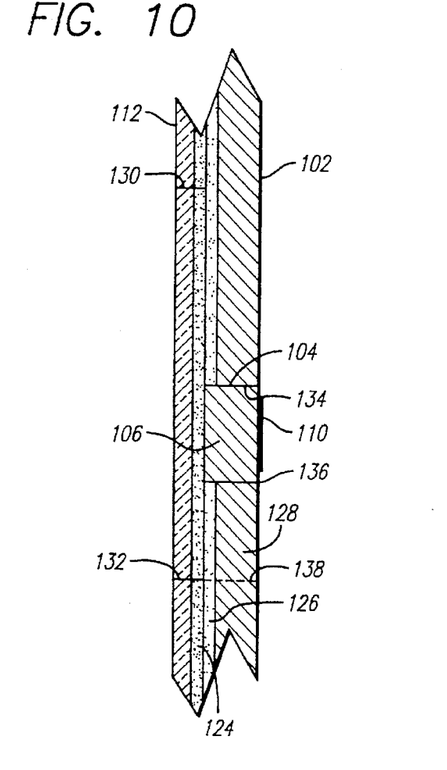
FIG. 10 is a sectional view taken about line 10—10 of FIG. 9.

Transparent plastic film 112 is coated with an adhesive layer 124, as seen in FIG. 10. FIG. 9 shows that sheet of principal material 102 is treated with an adhesive release agent 126, which may be silicone based. Adhesive release agent 126 is provided in special patterns on sheet of principal material 102, such that the printing card 106 is not provided with an adhesive release agent. This ensures that printing cards 106 adhere to transparent plastic film 112 and are not easily removed therefrom. On the other hand, cardstock wings 108 are treated with the adhesive release agent 126, so that cardstock wings 108 can be delaminated from transparent plastic film layer 112.

Returning to FIG. 10, various features are shown in a cross-section taken about line 10—10 of FIG. 9. Sheet of principal material 102 acts as a backing sheet which has a first face having a printing surface and a second face having the patterns of adhesive release agent 126. The transparent plastic film 112 is juxtaposed to sheet of material 102 and is coated with a coating of pressure sensitive adhesive 124. A plurality of cards such as 106 are cut from sheet of material 102 and remain in place on sheet 102 at the positions from which they were cut. The sheet of lamination 112 is cut into a plurality of lamination members along first die-cut line 130 and second die-cut line 132, as well as other die-cut lines.

Each die-cut pattern 114 and its associated printing card 106 forms a card/lamination set. Each card/lamination set remains intact and in place on assembly 100 during printing, after which indicia 110 has been printed on the printing surface of the printing card 106.

Figure 11:
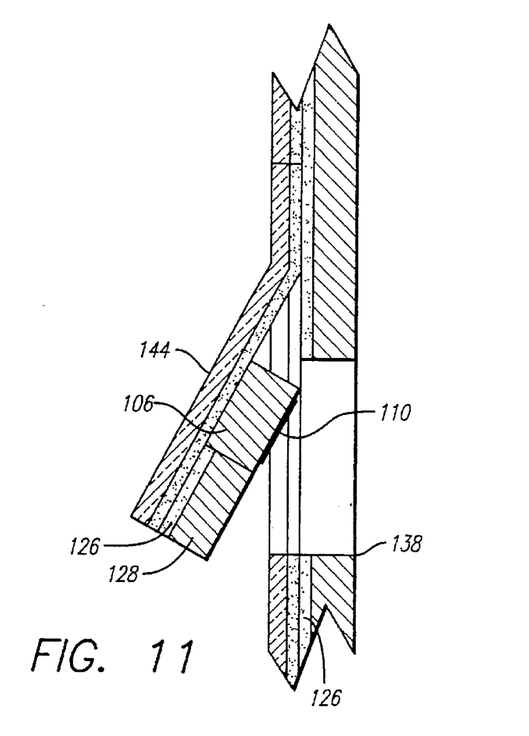
FIG. 11 shows the sectional view of FIG. 10 with a card/lamination set being removed from the assembly.

FIG. 11 illustrates a card/lamination set 144 being removed from assembly 100 after printing. Die cut card 106 separates from assembly 100 along die-cut line 134. Cardstock wing portion 108 separates from assembly 100 along line of perforations 138. It should be noted that a user will need to apply some pressure along line of perforation 138 in order to cause card/lamination set 144 to separate from assembly 100. After the perforations have been broken, the user rotates the card/lamination set so as to cause the upper half of the die-cut pattern 114 to separate from the sheet of principal material 102 along the adhesive release agent 7.

Figure 12:
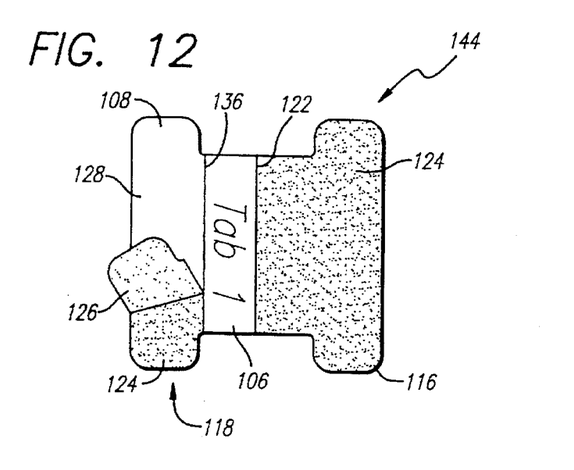
FIG. 12 is a perspective view of the card lamination set of FIG. 11, which has been removed from the assembly and from which a backing wing is being removed.

FIG. 12 shows what a card/lamination set 144 looks like after separation from assembly 100. Approximately ½ of the lamination portion of card/lamination set 144 has no backing at this point, and adhesive 124 is exposed this exposed portion of the lamination adhesive corresponds to approximately ½ of the die-cut pattern 114 and is all of the lamination member falling on one side of line of symmetry 122. When the user is ready to apply the card/lamination set to a document page, the user removes cardstock wing 108 from the card/lamination set along die-cut line 136. Cardstock wing 108 includes adhesive release agent 126 for making removal of wing 108 fairly easy.

Figure 13:
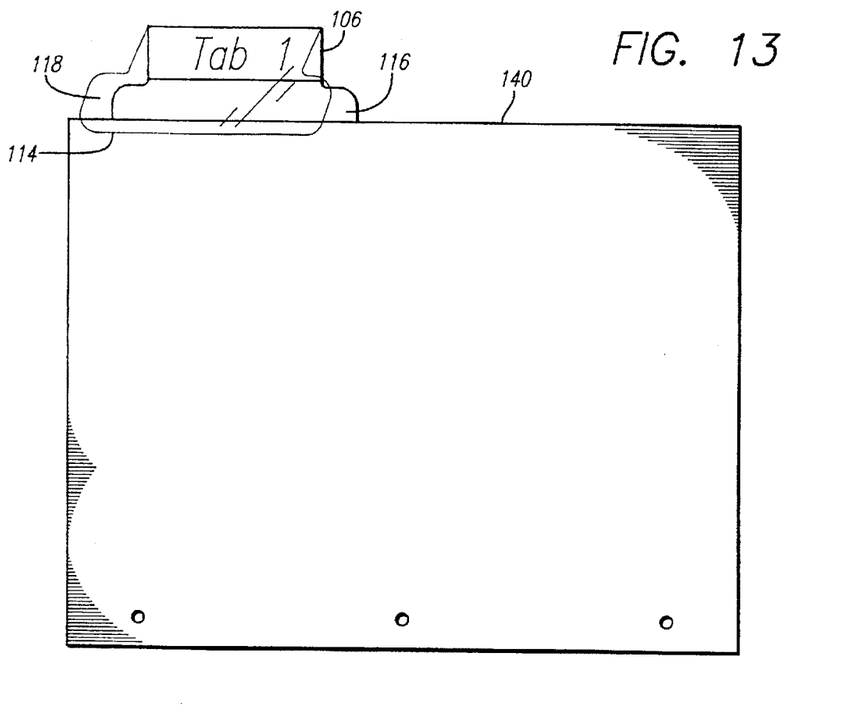
FIG. 13 is a perspective view of a document page to which an adhesive index tab is being applied.

FIG. 13 illustrates that the user first applies first wing 116 of the lamination to a back side of document page 140. The user then folds second wing 118 at line of symmetry 122 to cover the printed surface of printing card 106. At the same time, the user presses second lamination wing 118 onto document page 140, thereby yielding a document page having an index tab.

Second Alternative Preferred Embodiment: Hanging File Folder Tab

Figure 14:
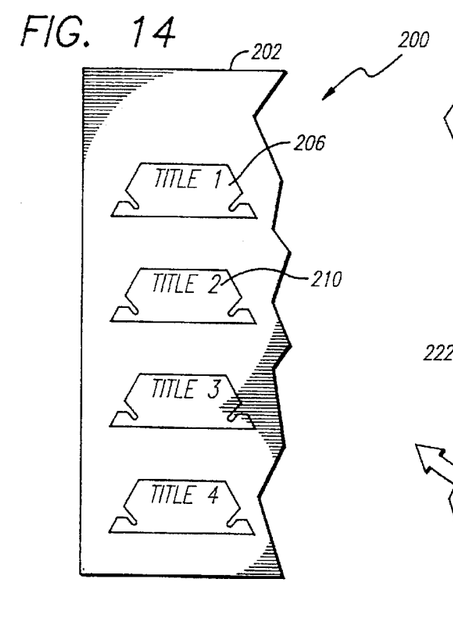
FIG. 14 is a perspective view of the printing surface of the backing layer of an assembly for a hanging file folder tab.
Figure 15:
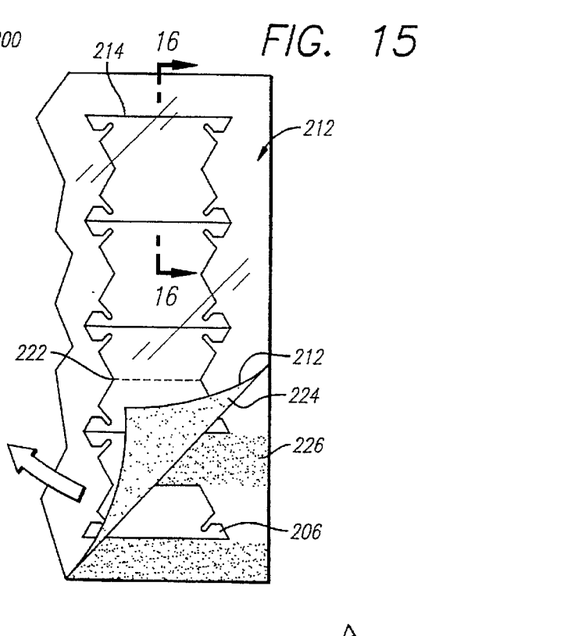
FIG. 15 is a perspective view showing the transparent plastic film backside of the assembly of FIG. 14, with the lamination partially peeled away in the lower right hand corner to reveal patterns of adhesive release agent on the backside of the backing layer.

A second alternative embodiment of the present invention is a self-laminating hanging file folder tab, as described by FIGS. 14 through 19. An assembly 200 includes a paper sheet 202 having a series of spaced, die-cut printing cards 206. FIG. 15 shows the reverse side of assembly 200, which is predominantly a lamination sheet 212. The lamination sheet 212 has substantially the same width and length of paper sheet 202, such that paper layer 202 and lamination sheet 212 are coextensive. The lamination sheet 212 includes a series of die-cut patterns 214. The shape of printing cards 206 correspond to the shape of the bottom half of die-cut patterns 214, which are symmetrical about lines of symmetry 222.

Die-cut printing cards 206 are typically cardstock which is not treated with an adhesive release agent. However, the spaces separating die-cut printing cards 206 are typically treated with a silicone adhesive release agent 226. Thus, adhesive release agent 226 is provided in selected areas of paper layer 202, but not in other areas. Lamination sheet 212 includes a coating of pressure sensitive adhesive 224, which may be a permanent adhesive or alternatively may be an adhesive that may be repeatedly sealed and unsealed.

Figures 16, 17, 18:
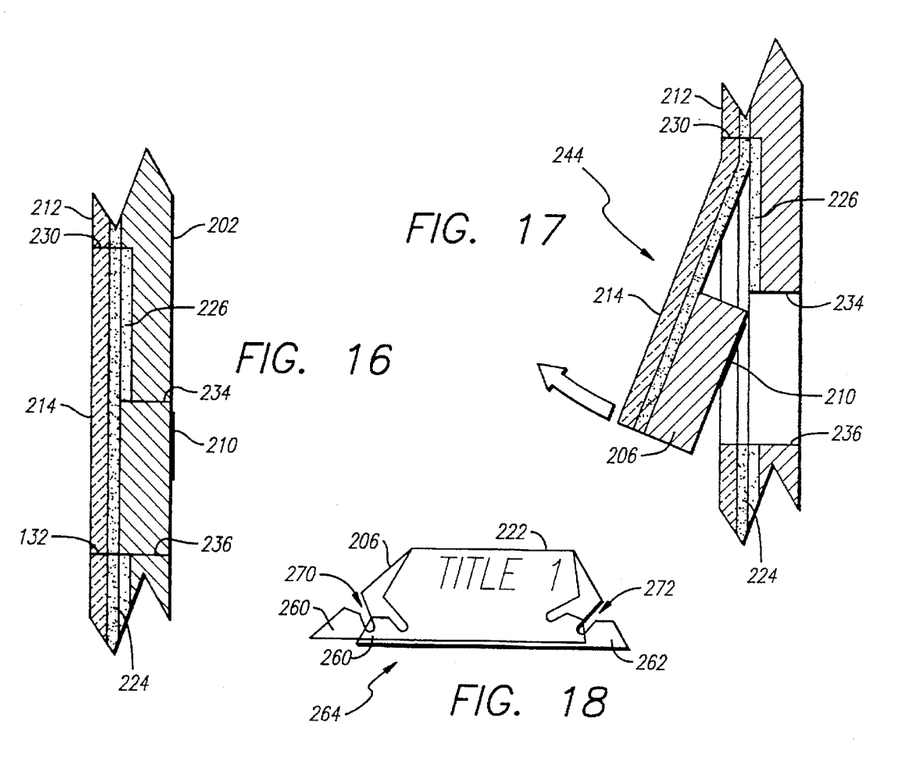
FIG. 16 is a sectional view taken across line 16—16 of FIG. 15.
FIG. 17 shows the sectional view of FIG. 16 with a card/lamination member set being removed from the assembly.
FIG. 18 a perspective view of the card/lamination member set of FIG. 17 with the lamination member being folded about its line of symmetry to complete a laminated file folder tab.

FIG. 16 shows the assembly 200 in cross-section about line 16—16 of FIG. 14. Lamination die-cut pattern 214 is bounded on one side by a die-cut 230, which passes through the lamination sheet 212 but not through the paper layer 202. Lamination die-cut pattern 214 is bounded on the other side by a die-cut 236, which passes through both lamination sheet 212 and paper sheet 202. A further die-cut 234 passes through the paper sheet layer 202 but not through the lamination sheet 212. Die-cut 234 is located intermediate to die-cuts 236 and 230. Pressure sensitive adhesive 224 serves to bond lamination sheet 212 to paper sheet 202.

FIG. 17 shows how a user removes a card/lamination set 244 from the assembly 200. The user pushes on the card/lamination set 244 to separate the card/lamination set from the assembly at die-cuts 236, 234 and 230. The die-cut lamination pattern 214, also known as a lamination member, separates easily from paper sheet layer 202 in the areas having adhesive release agent 226.

Once a card/lamination set 244 has been removed from assembly 200, the user finishes the hanging file folder tab by folding over the lamination member 214 at its line of symmetry 222 to cover and adhere to die-cut printing card 206. Note that the shape of lamination member 214 and die-cut printing card 206 is such that the finished laminated tab 264 has right engaging toe 262 and left engaging toe 260, characterized by inwardly extending channels 272 and 270.

Figure 19:
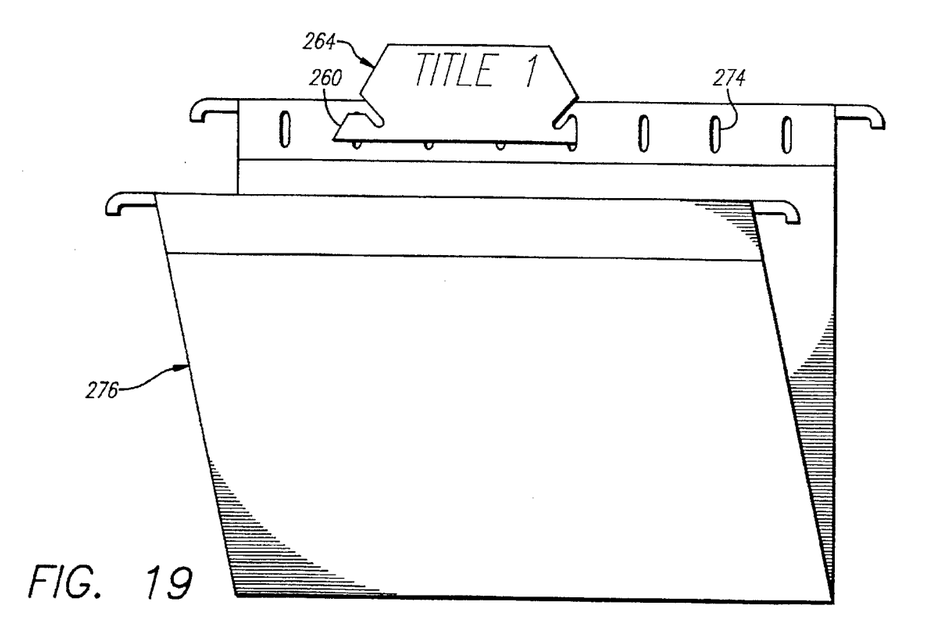
FIG. 19 is a perspective view showing a file folder tab being inserted into spaced tab slogs of a hanging file folder.

Once the user has pressed the lamination member 214 over the entire width and length of die-cut card 206, the user may then insert completed laminated tab 264 into a hanging file 276, as illustrated in FIG. 19. Hanging file 276 has spaced tab slots 274, into which engaging toes 260 and 262 may engage. FIG. 19 shows a laminated tab 264 having been inserted at right engaging toe 262 into a spaced tab slot 274, with left engaging toe 260 remaining to be inserted into another spaced tab slot by the user. Thus, a hanging file 276 is thereby identified by laminated tab 264.

It may be noted that one difference between the self laminated adhesive index tab embodiment and the self laminated hanging file folder tab embodiment is that the printed card of the latter extends along the entire length of one side of the line of symmetry of the lamination member. On the other hand, with the adhesive index tab embodiment, the printing card does not extend the entire length of one side of the line of symmetry. Instead, the printing card has one edge along the line of symmetry but extends only to the beginning of the wing on that side of the line of symmetry. That is, the hanging file folder tab can be said to have a printing card which occupies the entirety of one of the two identical halves of the lamination member. In contrast, the printing card of the adhesive index tab embodiment takes up only part of ½ of the lamination member, leaving the wing of that half of the member uncovered immediately prior to being applied to a document page.

It is preferable in some applications to use a permanent adhesive, which bonds the label to the substrate with a particularly strong bond. In this regard, the nature of an adhesive, whether permanent or removable, is often specified by the force required to peel (peel force) a one inch sample strip at right angles from a stainless steel surface to which it has been adhered. Standards and procedures for measuring peel forces have been established by the Pressure Sensitive Tape Council, and the peel forces as used herein relate to tests made pursuant to such standard procedures. The designation "permanent adhesives" is normally applied to adhesives having peel forces in the order of 3 pounds or more, while adhesives having a peel force of less than about 2 pounds are normally referred to as removable adhesive coatings.

The proportional dimensions of the drawings are for illustrative purposes only. Thus, the adhesive in the cross-sectional views, as well as other aspects of the assembly, are drawn out of proportion for clarity of explanation.

In conclusion, it is to be understood that the foregoing detailed description and the accompanying drawings relate to the presently preferred illustrative embodiments of the invention. However, various changes may be made without departing from the spirit and scope of the invention. Thus, by way of example are not of limitation.

The present invention is not limited to any one application. The present invention encompasses name tags for conferences, gift tags, parking passes, and any other laminated card. After a card has been printed, a user may glue or otherwise attach a photograph to the printing surface of the card. The user can then fold the lamination strip over the card and photograph to create a photo identification card. It is further noted that although fairly heavy paper or card stock is preferred, the term "card" as used herein could refer to normal sheets of paper employed to form laminated assemblies, as disclosed herein.

The present invention also encompasses cards which have shapes other than a standard rectangular card. For instance, the present invention includes an assembly for making laminated cards for rotary address files such as those available from the Rolodex Corporation of Secaucus, N.J. One problem with non-laminated cards for rotary address files is that they easily become dirty and worn. However, the present invention provides a system for creating long-lasting rotary address cards that will not deteriorate with normal use.

The present invention also encompasses other laminated cards, such as custom-designed playing cards which a user designs on a personal computer using clip art images and text. Accordingly, the present invention is not limited to the arrangement shown in the drawings and described hereinabove.

We claim:

1. An assembly for creating laminated cards for printing by a laser printer, ink jet printer or photocopier comprising:
 a sheet of cardstock, said cardstock having a first face comprising a printing surface and a second face on the opposite side of said sheet from said first face, said second face comprising areas having a release coating and other areas that are free of release coating;
 a sheet of transparent plastic film juxtaposed to and adhering to said second face of said sheet of cardstock, said sheet of plastic film having a coating of pressure sensitive adhesive which adheres said plastic sheet to said second face of said sheet of cardstock;
 a plurality of cards cut from predetermined positions of said sheet of cardstock, said cards remaining in the same said predetermined positions on said sheet of cardstock from which they were cut;
 said sheet of plastic film being cut into a plurality of symmetrical lamination members each having a line of symmetry, each of said lamination members covering and adhering to a corresponding one of said cards to form a card/lamination set, each of said lamination members also removably adhering to said sheet of cardstock in at least one of said areas having a release coating;
 said assembly being divided into individual sections by at least one line of microperforations that extends through both said plastic film and said cardstock, each of said individual sections comprising at least one of said card/lamination sets, such that said sections may be individually separated along said line of microperforations from the assembly for individual printing in a laser printer, ink-jet printer or photocopier;
 each of said cards being substantially free of a release coating and therefore being securely adhered to a corresponding one of said lamination members;
 each said lamination member having an extent approximately equal to twice the extent of each said card;
 said sheet of cardstock and said sheet of plastic film being substantially coextensive, each having substantially the same width and length as the other; and
 said assembly being substantially flat and having substantially constant thickness across the entire width and length of the assembly so as to prevent jamming in a laser printer, ink jet printer, or photocopier, wherein each of said card/lamination sets may be individually detached from said assembly, and each lamination member may be folded over at its line of symmetry after detachment from said assembly to laminate its corresponding card.

2. An assembly for creating laminated cards as defined in claim 1, wherein the lamination member of each card/lamination set is longer and wider than its corresponding card.

3. An assembly for creating laminated cards as defined in claim 1, wherein said card is substantially rectangular and said lamination member is a substantially rectangular lamination strip which is approximately twice as long as said card.

4. An assembly as defined in claim 1, wherein said lamination member comprises a line of perforations along said line of symmetry, thereby assisting the user in folding the lamination member about the line of symmetry.

5. An assembly as defined in claim 1, wherein said card/lamination set comprises a hanging file tab which has a left engagement toe and a right engagement toe when said lamination member is folded about its line of symmetry over its corresponding card, said engagement toes each having an inwardly extending slot.

6. An assembly as defined in claim 1, wherein said card/lamination set comprises an index tab, and said card is adhered to said lamination member entirely on one side of said line of symmetry, said one side of said lamination member extending lengthwise beyond said card.

7. An assembly as defined in claim 1, wherein said assembly is no greater than 15 mils thick.

8. An assembly as defined in claim 1, wherein said pressure sensitive adhesive is a permanent adhesive.

9. An assembly as defined in claim 1, wherein said assembly is divided into two identical sections in its lengthwise direction by a line of microperforations which extend through both said sheet of plastic lamination and said sheet of cardstock, said line of microperforations extending across the full width of said assembly.

10. An assembly for creating laminated cards which may be printed in a laser printer, ink jet printer or photocopier, the assembly comprising:

a backing sheet, said backing sheet having a first face comprising a printing surface and a second face, said backing sheet having a release coating in only selected portions of said second face;

a sheet of substantially transparent plastic lamination juxtaposed to and adhering to said second face of said backing sheet, said sheet of lamination having a coating of pressure sensitive adhesive in at least some areas which adheres said sheet to said second face of said backing sheet;

a plurality of cards cut from said backing sheet, said cards remaining in place on said backing sheet at the positions from which they were cut, each of said cards having an upper surface that is at least partially free of release coating;

said sheet of substantially transparent plastic lamination being cut into a plurality of lamination members, each of said lamination members covering and firmly adhering to at least a portion of the upper surface of a corresponding one of said cards to form a card/lamination set, each of said lamination members also removably adhering to said backing sheet in an area having said release coating but firmly adhering to at least a portion of said upper surface of said corresponding card, with adhesive directly engaging the greater portion of the area of the upper surface of said corresponding card with a mating area of the transparent lamination member to firmly adhere the card to the lamination member;

said backing sheet and said sheet of lamination being substantially coextensive, each having substantially the same width and length as the other;

each said lamination member having an extent approximately equal to twice the extent of each said card; and said assembly being substantially flat and having substantially constant thickness across the entire width and length of the assembly so as to prevent jamming in a laser printer, ink jet printer, or photocopier, wherein each of said card/lamination sets is individually detachable from said assembly, and each lamination member is foldable over after detachment from said assembly to laminate its corresponding card, such that the printing surface of the card is visible through the plastic lamination.

11. An assembly as defined in claim 10 wherein said assembly is divided into individual sections by at least one line of weakness which weakens both said backing sheet and said lamination sheet, each of said individual sections comprising at least one said card/lamination set, such that said individual sections may be individually separated along said line of weakness from the assembly for individual printing in laser printers, ink-jet printers and photocopiers.

12. An assembly as defined in claim 10, wherein said card/lamination set comprises a hanging file tab which has a left engagement toe and a right engagement toe when said lamination member is folded about its line of symmetry over its corresponding card, said engagement toes each having an inwardly extending slot.

13. An assembly as defined in claim 10, wherein said card/lamination set comprises an index tab, and said card is adhered to said lamination member entirely on one side of said line of symmetry, said card having one edge along said line of symmetry, said one side of said lamination member extending lengthwise beyond said card.

14. An assembly as defined in claim 10, wherein said lamination member is symmetrical and comprises a line of perforations along its line of symmetry, thereby assisting the user in folding the lamination member about the line of symmetry.

15. An assembly as defined in claim 10, wherein said assembly is no greater than 15 mils thick.

16. An assembly as defined in claim 10, wherein said pressure sensitive adhesive is a permanent adhesive.

17. An assembly as defined in claim 10, wherein said backing sheet is paper.

18. An assembly for creating laminated cards for printing by a laser or inkjet printer or photocopier, the assembly comprising:

a backing sheet comprising a first side, a second side which has a printing surface, and an opening;

a card, said card substantially filling said opening and being removably positioned in said opening;

a substantially transparent plastic lamination sheet adhered to said first side of said backing sheet, said lamination sheet being substantially coextensive with said backing sheet;

said lamination member having an extent approximately equal to twice the extent of said card; and said lamination sheet comprising a removable portion which firmly adheres to and covers one surface of said card and which removably adheres to said backing sheet adjacent to said opening;

wherein the assembly has a substantially constant thickness across the entire width and length of the assembly so as to prevent jamming in a laser or inkjet printer or photocopier.

19. An assembly as defined in claim 18, wherein said card/lamination set comprises a hanging file tab which has a left engagement toe and a right engagement toe when said lamination member is folded about its line of symmetry over its corresponding card, said engagement toes each having an inwardly extending slot.

20. An assembly as defined in claim 18, wherein said card/lamination set comprises an index tab, and said card is adhered to said removable portion of said lamination sheet entirely on one side of said line of symmetry.

21. An assembly as defined in claim 18, wherein said assembly further comprises a plurality of cards and corresponding removable portions of said lamination sheet.

22. An assembly as defined in claim 21, wherein said assembly further comprises at least one line of weakness that weakens both said lamination sheet and said backing sheet and which separates said assembly into sections, each of said sections comprising at least one removable portion of said lamination sheet and at least one card.

23. An assembly as defined in claim 21, wherein said assembly is approximately 4½" wide by 11" long and is divided symmetrically in its lengthwise direction into two sections by a line of microperforations which extend across the width of the assembly, said line of microperforations also extending through both said sheet of lamination and said backing sheet.

24. An assembly as defined in claim 18 wherein said backing sheet further includes a release coating over the entire width and length of the backing sheet.

25. An assembly as defined in claim 18, wherein said assembly is no more than 15 mils thick.

26. An assembly as defined in claim 18 wherein said assembly is less than approximately 5 inches wide.

27. An assembly for creating laminated cards for printing by a laser printer, ink jet printer or photocopier comprising:

a sheet of cardstock, said cardstock having a first face comprising a printing surface and a second face on the opposite side of said sheet from said first face, said second face comprising a release coating in only selected portions of said second face;

a sheet of substantially transparent plastic film juxtaposed to and adhering to said second face of said sheet of cardstock, said sheet of plastic film having a coating of pressure sensitive adhesive which adheres said plastic sheet to said second face of said sheet of cardstock;

a plurality of cards cut from predetermined positions of said sheet of cardstock, said cards remaining in the same said predetermined positions on said sheet of cardstock from which they were cut;

said sheet of plastic film being cut into a plurality of symmetrical lamination members each having a line of symmetry, each of said lamination members covering and firmly adhering to a surface of a corresponding one of said cards to form a card/lamination set, each of said lamination members also removably adhering to said sheet of cardstock in only said areas having a release coating and firmly adhering to said sheet of cardstock in other areas;

said assembly being divided into individual sections by at least one transverse line of weakness that extends through both said plastic film and said cardstock, each of said individual sections comprising at least one of said card/lamination sets, such that said sections may be individually separated along said line of weakness from the assembly for individual printing in a printer, and each lamination member being at least twice as long as the length of a corresponding card;

said sheet of cardstock and said sheet of plastic film being substantially coextensive, each having substantially the same width and length as the other; and said assembly being substantially flat and having substantially constant thickness across the entire width and length of the assembly so as to prevent jamming in a printer, wherein each of said card/lamination sets may be individually detached from said assembly, and each lamination member may be folded over at its line of symmetry after detachment from said assembly to laminate its corresponding card.

28. An assembly for creating laminated cards for printing by a laser printer, ink jet printer or photocopier comprising:

a backing sheet having a first face comprising a printing surface and a second face on the opposite side of said sheet from said first face, said second face comprising areas having a release coating and other areas that are free of release coating;

a sheet of substantially transparent plastic film juxtaposed to and adhering to said second face of said backing sheet, said sheet of plastic film having a coating of pressure sensitive adhesive which adheres said plastic film to said second face of said backing sheet;

a plurality of cards cut by lines of weakness in predetermined positions of said backing sheet, said cards remaining in the same said predetermined positions on said backing sheet from which they were cut, said cards having front and back surfaces, said front and back surfaces being substantially free of release coating;

said sheet of plastic film having a plurality of symmetrical lamination members cut by lines of weakness, each of said lamination members covering and adhering to a corresponding one of said cards to form a card/lamination set, each of said lamination members also removably adhering to said backing sheet in at least one of said areas having a release coating;

each of said lamination members being approximately twice as long and approximately as wide as a corresponding one of said cards;

said backing sheet and said sheet of plastic film being substantially coextensive, each having substantially the same width and length as the other;

said assembly having an initial, pre-printed mode in which a portion of each of said lamination members is firmly adhered to the front surface of a corresponding card and another portion is removably adhered to a release coated area of said backing sheet, and having a printed mode in which at least one of said lamination members is folded over and is firmly adhered to both the front and back surfaces of its corresponding card, and said card being formed of a single layer of said backing sheet; and said assembly being substantially flat and having substantially constant thickness across the entire width and length of the assembly so as to prevent jamming in a printer, wherein each of said card/lamination sets may be individually removed from said assembly, and each lamination member may be folded over after detachment from said assembly to laminate its corresponding card with the printing surface of the card being visible through the substantially transparent lamination.

* * * * *